Figure 1:
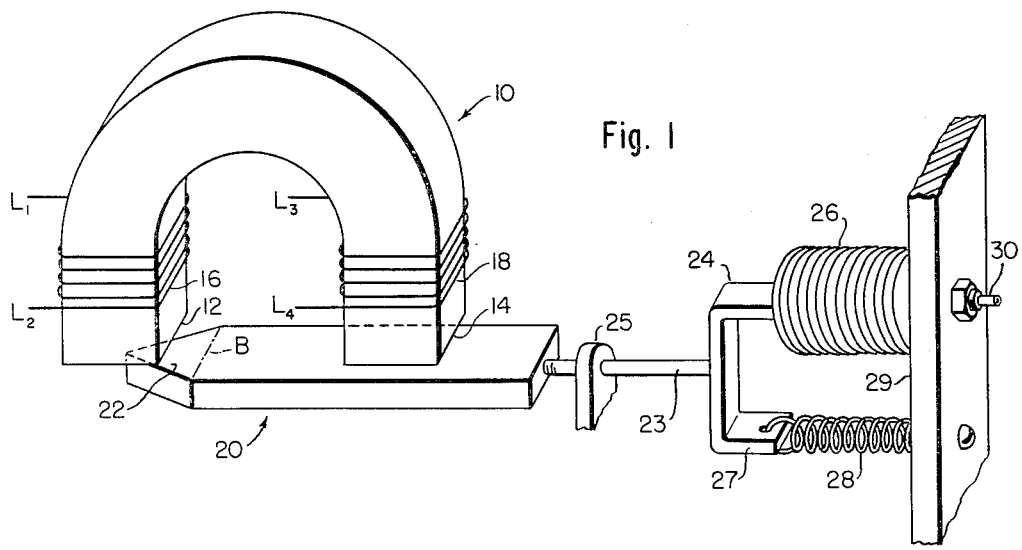

Dec. 11, 1956  W. A. JONES  2,774,057

MAGNETIC MODULATOR

Filed Oct. 29, 1953

*INVENTOR.*
WILLIAM A. JONES

BY
Kenway, Jenney, Witter & Hildreth
ATTORNEYS 2,774,057
Patented Dec. 11, 1956

United States Patent Office

2,774,057
MAGNETIC MODULATOR

William A. Jones, Newtonville, Mass., assignor, by mesne assignments, to Detroit Controls Corporation, Detroit, Mich., a corporation of Michigan Application October 29, 1953, Serial No. 389,050

5 Claims. (Cl. 340—195)

The present invention relates to devices for producing electrical signals as functions of mechanical movements. In particular the invention encompasses a magnetic circuit so arranged as to yield an electrical output signal of a magnitude a predetermined mathematical function of a mechanical displacement.

It is often the practice in obtaining measurements of a variable to measure directly a mechanical displacement resulting therefrom. An example of a means for effecting such a measurement is the presence of a scale juxtaposed with an indicating needle in a conventional pressure gauge. In most pressure gauges the deflection of the indicating needle is directly proportional to changes in pressure and, therefore, the scale provided for measuring the pressure may be linear. In numerous other instances the deflection of an indicating member is not directly or inversely proportional to the variable causing the deflection, but instead is a complex function of the variable such as a square, square root or trigonometric function; hence, linear scales may not be used as a means for indicating the magnitude of the variable. This invention is particularly suited for use under any of these conditions, for it will be seen that if an electrical signal may be rendered which is a particular function of the displacement of the indicator, a linear relationship may be established between the signal and the variable causing the displacement. To obtain direct readings of the variable it is then only necessary to select a particular meter responsive to the output signal.

The primary object of this invention is to provide a simple and accurate instrument capable of responding to a mechanical movement such as deflection under pressure, acceleration, gravity, etc. and so constructed as to yield an output signal proportional to a complex mathematical function of that movement.

A more fundamental object of the invention is to improve the accuracy and reliability with which measurements can be made of mechanical movements.

An important feature of the invention resides in the combination of a magnetic circuit including a pole face separated by an air gap from an armature movable in response to an exterior force and so shaped as to present to the pole face an area whose extent varies and/or whose gap varies with the movement. The rate of change of the area and/or the gap depends upon its shape which may be calculated to produce the desired mathematical function as reflected in the value of the electrical output of the circuit.

If the face of a pole piece be square and the armature of triangular configuration, the permeance of the magnetic circuit will, if the air gap is maintained constant, vary as the square of the extent of linear movement of the armature across the pole face, within certain limits. If the armature be shaped as a concave wedge, the permeance will vary as the cube of the displacement of the armature. For a cosine function, the armature should have the shape of one quarter of a sine curve. Other shapes and functions will suggest themselves to those skilled in the art.

Figure 2:
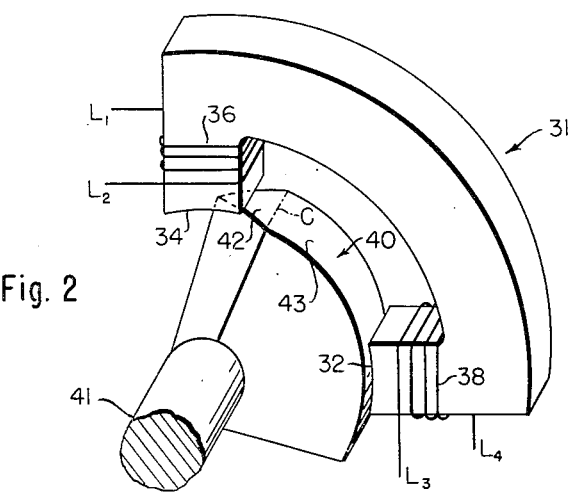
Figure 3:
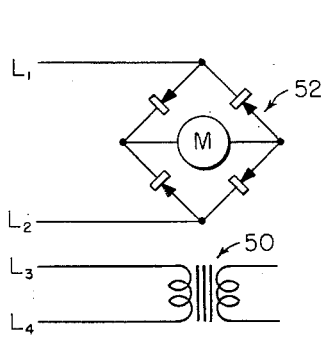
Figure 4:
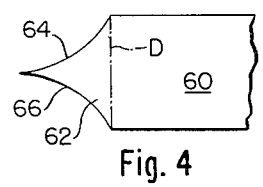
Figure 5:
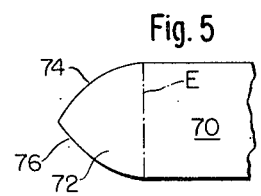

These and other objects and features of the invention will be more readily understood and appreciated from the following detailed description of preferred embodiments thereof selected for purposes of illustration and shown in the accompanying drawing, in which:

Fig. 1 is a view in perspective of a magnetic measuring instrument constructed in accordance with the invention, Fig. 2 is a view in perspective of another magnetic measuring instrument constructed in accordance with the invention, Fig. 3 is a schematic diagram of one form of an exciting and pick-up circuit which may be employed in carrying out the invention, Fig. 4 is a fragmentary plan view of an armature constructed in accordance with the invention, and Fig. 5 is a fragmentary plan view of another armature constructed in accordance with the invention.

In the embodiment of the invention represented in Fig. 1, the device is organized about an electro-magnet 10 of horseshoe configuration having opposed pole pieces 12 and 14 of square cross-section. An exciter coil 18 is wound on the pole piece 14 and a secondary coil 16 upon the pole piece 12. Associated with the magnet is a flat iron armature 20 having a triangular segment 22 at one end and supported for reciprocation at its other end by a shaft 23 sliding in a support 25 and terminating in a U-shaped member of which one leg 27 is secured to a coil spring 28, while the other leg 24 is secured to one end of a bellows 26. The spring 28 and bellows 26 are secured to a flat plate 29.

The bellows 26 is responsive to changes in pressure and communicates with a pressure source through a conduit or pipe 30. The pressure source is not shown, but may comprise any system developing a pressure to be measured. As the bellows expands and contracts in response to changes of pressure (stabilized by the spring 28), the flat armature 20 moves back and forth beneath the faces of the pole pieces 12 and 14. The distance between the armature 20 and the pole pieces remains fixed, since the armature moves only in one plane; however, the permeance of the magnetic circuit varies as the area of the triangular segment interposed beneath the pole piece 12 changes. When the coil 18 is excited by a stabilized source of alternating current, the permeance of the magnetic circuit is equal to the product of the area of the triangle projected on the pole piece 12 multiplied by a constant expressive of the design factors of the system, including the angle of the apex of the armature, the air gap distance, the thickness of the armature, the nature of the material forming the magnetic circuit, etc. Consequently when the armature 20 is moved a finite distance, the change in output voltage of the coil 16 will vary by an amount proportional to the square of the distance moved. This relationship holds true for so long as the base of the triangle (shown by the dotted line B) does not come beneath the pole face 12.

If, therefore, the armature be coupled for movement in response to applied force, the output voltage will vary as the square of that applied force.

In Fig. 3 there is shown a simple circuit for achieving the desired readings. A transformer 50 having its secondary connected across the exciter coil 18 through leads $L_3$ and $L_4$ serves as a means for energizing the magnetic circuit formed by the electro-magnet 10 and the armature 20. A bridge rectifier 52 connected across the pick-up coil 16 by leads $L_1$ and $L_2$ has across the bridge a voltmeter M. The induced voltage in the pick-up coil 16 will be directly indicated by the voltmeter.

In Fig. 2 there is shown an alternative form of embodiment of the invention as applied to measurement of rotation instead of reciprocation as in Fig. 1. In this embodiment of the invention the device is organized about an electro-magnet 31 having a pair of pole faces 32 and 34. A rotor 40, quadrant shaped in cross-section, is supported at its apex for rotation on a shaft 41. The curved surface 43 of the rotor 40 facing the pole pieces 32 and 34 is so disposed as to maintain a constant gap in the magnetic circuit formed by the electro-magnet 31 and rotor 40. Surface 43 has formed at one end a triangular segment 42 disposed adjacent the face of the pole piece 34 whereby angular movement of the rotor 40 will vary the projected area of the surface 43 on the face. An exciter coil 38 and a pick-up coil 36 are respectively wound about the pole pieces 32 and 34, providing an expedient means of achieving measurement of angular displacement of the rotor.

Proceeding now to the operation of the device illustrated in Fig. 2, counterclockwise rotation of the shaft 41 will vary the projected area of the segment 42 directly as the square of angular displacement between fixed limits of movement defined by a position wherein the apex of the triangular segment 42 just underlies the face 34 and a position wherein the base C of the triangular segment 42 underlies the right margin of the pole face. Upon excitation of the coil 38 by means of a circuit such as is illustrated in Fig. 3, the permeance of the magnetic circuit will vary directly as a function of the projected area of the rotor on the pole face. The output signal of the coil 36 which may be measured by means of the meter M in the bridge rectifier connected across the coil will be of a magnitude proportional to the square of the angular displacement. For purposes of emphasis it is again stated that in this configuration the gap in the magnetic circuit remains constant.

A number of modifications of the above described embodiment will obviously occur to one skilled in the art, and some of these will now be discussed in detail. In each embodiment the pick-up and exciting coils have been illustrated and described as being wound about the pole pieces of the electro-magnet, though they need not be confined to those positions. Each of the coils may be wound about any portion of the magnetic circuit and the same results will be achieved. Additionally, though the armatures 20 and 40 have been illustrated and described as having a triangular segment adjacent the face of the pole piece about which is wound the pick-up coil, the device would be equally effective if the triangular segment were positioned adjacent the other pole face. Alternatively, one of the pole faces may be of triangular cross-section, while the opposed surface of the armature is of constant width.

Thus far the invention described basically is in the nature of a magnetic squaring device characterized by a variable area and a fixed gap in the magnetic circuit. Fig. 4 illustrates a modification of a segment of the embodiment shown in Figs. 1 and 2 which, when incorporated in either of those devices, will cause them to render an output signal in the pick-up coil a function of the cube of the displacement. Triangular segments 22 and 42 must be replaced by a segment 62 defined by a pair of opposed parabolas 64 and 66 respectively expressed mathematically as $Y=X^2$ and $-Y=X^2$, the X axis lying along the center line of the armature surface and the Y axis disposed perpendicular to the X axis in the plane of the surface of the armature with the leading edge of the segment positioned at zero Y and zero X. Once again displacement of the armature is limited between positions wherein the leading edge of the segment just underlies the pole face and the base D of the segment underlies the right edge of the pole face.

Illustrated in Fig. 5 is a segment of an armature 70 formed to render a trigonometric function of a displacement when introduced in the fully illustrated embodiments of the invention. A segment 72 formed by generating a quarter of a sine wave 74 and a quarter of a sine wave 76 will oppose one of the pole faces of the electro-magnet, and when substituted for the triangular segments of the embodiments of Figs. 1 and 2 will render an output signal in the pick-up coil a function of the cosine of the displacement of the armature. The limits of movement of the armature once again will be determined by the leading edge and the base E of the segment.

From the foregoing description of the illustrated embodiments it should occur to a person skilled in the art that the invention may be broadly considered an integrating device, for it has been shown that the power of the equation defining the segment of the armature causing a change in area with displacement is one less than the power of the function of displacement determining the magnitude of the output signal. Specifically, the segment 22 of Fig. 1 is defined by first order equations and the output signal of the coil 16 is a function of the square of displacement; the segment 62 of the armature 60 shown in Fig. 4 is defined by second order equations and the output signal is a function of the cube of displacement; the segment 72 of the armature 70 is defined by sine curves, and the resulting output signal of the apparatus constructed in accordance with the invention is a cosine function of displacement. By induction it is seen that the equations of the curves defining the segment causing variations in area are readily determined by reducing by one the power of the function of displacement desired in the output signal. Therefore, if a square root function of displacement is desired for the output signal, the equation of the curve defining the segment will be in the minus one half power.

Proceeding further with a discussion of modifications of the invention within the purview of a man skilled in the art, thus far the invention has been limited to constant gap, variable area magnetic circuits, while it is obvious that the gap may be varied in place of or in addition to changes in area. If inverse functions of displacement are desired, they may readily be achieved by so shaping the segment of the armature under a pole face as to cause a change in the gap distance between the opposed surfaces of the pole face and armature with displacement. Because the permeance of a magnetic circuit changes inversely with the changes in air gap, it is only necessary to construct the armature in a manner whereby the gap varies by a function of the displacement equal to the desired function of the output signal to that displacement.

Proceeding one step further, by varying the air gap length as one function of displacement and varying the air gap area as a second function of displacement in the same magnetic circuit, it may be possible to produce an output signal directly proportional to a pair of variables producing the displacement of the armature. To simplify construction, the area may be varied at one pole face while the gap length is varied at the other of the pole faces.

Although I have described in detail a number of modifications of the invention, it has not been attempted to set forth in detail all the variations that are within the knowledge of a man skilled in the art. It is my desire, therefore, that the scope of the invention be limited not alone to the modifications illustrated and described.

Having thus described my invention, what I claim as new and desire to secure by Letters Patent of the United States is:

1. A magnetic modulator comprising a magnetic circuit, means for impressing a signal on said circuit, means for varying the reluctance of said circuit, said last-mentioned means including a stationary core member having a plurality of pole faces and a movable core member at a fixed distance from said stationary core member, said movable core member having at least a portion thereof profiled in accordance with a predetermined non-linear mathematical function, means for displacing said movable core member in a path at said fixed distance from said stationary core member to vary the projected area of said profiled portion of said movable core member on one of said plurality of pole faces, an external source for actuating said displacing means, and means for deriving from said magnetic circuit an output signal corresponding to said input signal but modulated in accordance with the position of said movable core member relative to said stationary core member and with said predetermined mathematical function.

2. A magnetic modulator comprising a magnetic circuit, means for impressing a signal on said circuit, means for varying the reluctance of said circuit, said last-mentioned means including a stationary core member having a plurality of pole faces and a movable core member at a fixed distance from said stationary core member, the leading edge of said movable core member being triangularly profiled, means for displacing said movable core member in a path at said fixed distance from said stationary core member to vary the projected area of said triangularly profiled leading edge of said movable core member on one of said plurality of pole faces, an external source for actuating said displacing means, and means for deriving from said magnetic circuit an output signal corresponding to said input signal but modulated in accordance with the square of the displacement of said movable core member relative to said stationary core member.

3. A magnetic modulator comprising a magnetic circuit, means for impressing a signal on said circuit, means for varying the reluctance of said circuit, said last-mentioned means including a stationary core member having a plurality of pole faces and a movable core member at a fixed distance from said stationary core member, the leading edge of said movable core member being profiled in accordance with curves geometrically defined by second order equations, means for displacing said movable core member in a path at said fixed distance from said stationary core member to vary the projected area of said profiled leading edge of said movable core member on one of said plurality of pole faces, means for displacing said movable core member in a path at said fixed distance from said stationary core member to vary the projected area of said profiled leading edge of said movable core member on one of said plurality of pole faces, an external source for actuating said displacing means, and means for deriving from said magnetic circuit an output signal corresponding to said input signal but modulated in accordance with the third power of the displacement of said movable core member relative to said stationary core member.

4. A magnetic modulator comprising a magnetic circuit, means for impressing a signal on said circuit, means for varying the reluctance of said circuit, said last-mentioned means including a stationary core member having a plurality of pole faces and a movable core member at a fixed distance from said stationary core member, the leading edge of said movable core member being profiled in accordance with intersecting quarter sine waves, the point of intersection of said quarter sine waves being the extreme tip of said movable core member, said quarter sine waves diverging rearwardly from said tip, means for displacing said movable core in a path at said fixed distance from said stationary core member to vary the projected area of said profiled leading edge of said movable core member on one of said plurality of pole faces, an external source for actuating said displacing means, and means for deriving from said magnetic circuit an output signal corresponding to said input signal but modulated in accordance with the cosine of the displacement of said movable core member relative to said stationary core member.

5. Apparatus for producing an electrical signal of a magnitude which is a predetermined non-linear mathematical function of pressure changes comprising a source of alternating voltage, an electromagnet having two pole faces, an exciter coil wound on said electromagnet adjacent one of said pole faces and energized by said source of alternating voltage, a pick-up coil wound on said electromagnet adjacent the other of said pole faces, an iron armature movable in a path at a fixed distance from said pole faces, one end of said flat iron armature being profiled in accordance with a non-linear mathematical function, means for displacing said armature along said path such that the area of only the profiled portion thereof is projected on said one of said pole faces, a bellows responsive to changes in pressure mechanically connected to said displacing means, said bellows expanding with increasing pressure within it to cause greater displacement of said armature and an increase of area of said profiled portion being projected upon said one of said pole faces and contracting with decreasing pressure within it to cause lesser displacement of said armature and a decrease of area of said profiled portion being projected upon said one of said pole faces, whereby the reluctance of said electromagnet is varied and voltage in said pick-up coil varies as a function of the displacement of said armature and of the configuration of said profiled portion.

References Cited in the file of this patent

UNITED STATES PATENTS

| | | |
|---|---|---|
| 1,615,018 | Langdon-Davies et al. | Jan. 18, 1927 |
| 2,080,177 | Lucas et al. | May 11, 1937 |
| 2,185,767 | Jefferies | Jan. 2, 1940 |
| 2,493,388 | Candy | Jan. 3, 1950 |
| 2,631,272 | Smith | Mar. 10, 1953 |

FOREIGN PATENTS

| | | |
|---|---|---|
| 239,091 | Switzerland | Dec. 3, 1945 |
| 1,010,170 | France | June 9, 1950 |